(12) United States Patent
Kamatani et al.

(10) Patent No.: US 11,760,342 B2
(45) Date of Patent: Sep. 19, 2023

(54) DRIVING ASSIST SYSTEM

(71) Applicant: Toyota Jidosha Kabushiki Kaisha, Toyota (JP)

(72) Inventors: Miyuki Kamatani, Hadano (JP); Kazuyuki Fujita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 17/155,909

(22) Filed: Jan. 22, 2021

(65) Prior Publication Data

US 2021/0229659 A1 Jul. 29, 2021

(30) Foreign Application Priority Data

Jan. 29, 2020 (JP) .................. 2020-012879

(51) Int. Cl.
*B60W 30/09* (2012.01)
*B60W 30/18* (2012.01)
*G06V 20/58* (2022.01)

(52) U.S. Cl.
CPC .......... *B60W 30/09* (2013.01); *B60W 30/181* (2013.01); *G06V 20/58* (2022.01);
(Continued)

(58) Field of Classification Search
CPC ............... B60W 30/09; B60W 30/181; B60W 2420/52; B60W 2510/18; B60W 2510/20; B60W 2554/20; B60W 2554/4049; B60W 2554/402; B60W 2554/4023; B60W 2554/4026; B60W 2554/4029; B60W 2554/80; B60W 10/04; B60W 10/18; B60W 10/20; B60W 30/0956; B60W 60/0017; B60W 40/02; B60W 50/14;
(Continued)

(56) References Cited

U.S. PATENT DOCUMENTS

2017/0084177 A1    3/2017  Matsuoka et al.
2018/0086346 A1*   3/2018  Fujisawa ............... B60W 40/08
(Continued)

FOREIGN PATENT DOCUMENTS

JP     2008-176397 A    7/2008
JP     2011-221757 A   11/2011
(Continued)

*Primary Examiner* — Isaac G Smith
*Assistant Examiner* — Jennifer M Anda
(74) *Attorney, Agent, or Firm* — Dinsmore & Shohl LLP

(57) ABSTRACT

A driving assist system assists driving of a vehicle. A deceleration target includes at least one of a preceding vehicle, a mandatory stop line, a mandatory stop sign, a traffic signal, and a stop line before the traffic signal that exist ahead of the vehicle. A risk factor includes at least one of a pedestrian, a bicycle, a motorcycle, an oncoming vehicle, and a parked vehicle that exist ahead of the vehicle. The driving assist system executes: deceleration assist control that automatically decelerates the vehicle before the deceleration target; and risk avoidance control that automatically performs at least one of steering and deceleration of the vehicle so as to avoid the risk factor. When both the deceleration assist control and the risk avoidance control operate concurrently, the driving assist system notifies a driver of the vehicle of not the deceleration target but the risk factor.

12 Claims, 20 Drawing Sheets

(52) U.S. Cl.
CPC ..... *B60W 2420/52* (2013.01); *B60W 2510/18* (2013.01); *B60W 2510/20* (2013.01); *B60W 2554/20* (2020.02); *B60W 2554/4049* (2020.02)

(58) Field of Classification Search
CPC ......... B60W 2552/50; B60W 2552/53; B60W 2554/00; B60W 2710/18; B60W 2710/20; G06V 20/58; G06V 20/582; G06V 20/584
See application file for complete search history.

(56) References Cited

U.S. PATENT DOCUMENTS

| | | | | |
|---|---|---|---|---|
| 2019/0023241 | A1* | 1/2019 | Kumagai | ................ B60T 7/22 |
| 2019/0061745 | A1* | 2/2019 | Hatano | ............ B60W 60/0053 |
| 2019/0092321 | A1* | 3/2019 | Shimizu | ............... B62D 15/025 |
| 2019/0299995 | A1 | 10/2019 | Tochigi et al. | |
| 2019/0367041 | A1* | 12/2019 | Nakano | ................ G06F 21/552 |
| 2020/0282986 | A1* | 9/2020 | Iwasaki | .................. G06V 20/58 |
| 2021/0129860 | A1* | 5/2021 | Lee | ........................ B60K 35/00 |
| 2021/0229660 | A1* | 7/2021 | Kamatani | ......... B60W 30/0956 |

FOREIGN PATENT DOCUMENTS

| | | |
|---|---|---|
| JP | 2017-059070 A | 3/2017 |
| JP | 2019-093882 A | 6/2019 |
| JP | 2019-182040 A | 10/2019 |

\* cited by examiner

DRIVING ASSIST SYSTEM

CROSS-REFERENCE TO RELATED APPLICATIONS

This application claims priority to Japanese Patent Application No. 2020-012879 filed on Jan. 29, 2020, which is incorporated herein by reference in its entirety.

BACKGROUND

Technical Field

The present disclosure relates to a driving assist system that assists driving of a vehicle.

Background Art

Japanese Laid-Open Patent Application Publication No. JP-2019-093882 discloses a driving assist device for a vehicle. The driving assist device includes a detection unit that detects a surrounding situation of the vehicle, a control unit that controls travel and stopping of the vehicle, and a notification unit that gives a notification to a driver of the vehicle. The detection unit detects a mandatory stop position ahead the vehicle. The control unit determines whether or not the vehicle enters a predetermined section including the detected mandatory stop position. When the vehicle enters the predetermined section, the control unit shifts to a mandatory stop mode that decelerates the vehicle to stop at the mandatory stop position while prohibiting an acceleration operation. The notification unit notifies the driver of the start of the mandatory stop mode.

SUMMARY

There are various examples of driving assist control that assists driving of a vehicle. An example of the driving assist control is "deceleration assist control" that automatically decelerating the vehicle as necessary. Examples of a deceleration target triggering the deceleration assist control include a preceding vehicle, a mandatory stop line, a traffic signal, and the like, each of which exists ahead of the vehicle. The deceleration assist control automatically decelerates the vehicle before such the deceleration target.

Another example of the driving assist control is "risk avoidance control" for avoiding a risk factor ahead of the vehicle. Examples of the risk factors include a pedestrians, a bicycle, a motorcycle, a parked vehicle, and the like, each of which exists ahead of the vehicle. The risk avoidance control automatically performs at least one of steering and deceleration of the vehicle so as to avoid the risk factor.

When the driving assist control operates, it is conceivable to notify a driver of the vehicle of the driving assist control being in operation. For example, when the deceleration assist control operates, the driver is notified of the deceleration target. Similarly, when the risk avoidance control operates, the driver is notified of the risk factor.

Next, a case where both the deceleration assist control and the risk avoidance control operate concurrently is considered. At this time, if both the deceleration target and the risk factor are notified to the driver at the same time, the driver may feel a sense of annoyance due to information overload. Therefore, for example, it is conceivable to notify the driver of only one of the deceleration assist control and the risk avoidance control requiring a higher deceleration. For example, when a deceleration required by the deceleration assist control is higher than a deceleration required by the risk avoidance control, only the deceleration target may be notified to the driver.

However, considering seriousness in the unlikely event of an accident, the risk factor such as a pedestrian is more important to the driver than just a deceleration target. If the driver is not notified of the risk factor despite that the driver perceives the risk factor, the driver may feel a sense of uneasiness. There is room for improvement in the notification when the deceleration assist control and the risk avoidance control operate concurrently.

An object of the present disclosure is to provide a technique capable of reducing driver's senses of annoyance and uneasiness about the notification in a case where the deceleration assist control and the risk avoidance control operate concurrently.

A first aspect is directed to a driving assist system that assists driving of a vehicle.

The driving assist system includes:
a processor; and
a memory that stores driving environment information indicating a driving environment for the vehicle.

A deceleration target includes at least one of a preceding vehicle, a mandatory stop line, a mandatory stop sign, a traffic signal, and a stop line before the traffic signal, each of which exists ahead of the vehicle.

A risk factor includes at least one of a pedestrian, a bicycle, a motorcycle, an oncoming vehicle, and a parked vehicle, each of which exists ahead of the vehicle.

The processor is configured to execute:
deceleration assist control that automatically decelerates the vehicle before the deceleration target based on the driving environment information;
risk avoidance control that automatically performs at least one of steering and deceleration of the vehicle so as to avoid the risk factor based on the driving environment information; and
a notification process that notifies a driver of the vehicle of the deceleration target or the risk factor.

The notification process includes notifying the driver of not the deceleration target but the risk factor in a period in which both the deceleration assist control and the risk avoidance control operate concurrently.

A second aspect is directed to a driving assist system that assists driving of a vehicle.

The driving assist system includes:
a processor; and
a memory that stores driving environment information indicating a driving environment for the vehicle.

A deceleration target includes at least one of a preceding vehicle, a mandatory stop line, a mandatory stop sign, a traffic signal, and a stop line before the traffic signal each of which exists ahead of the vehicle.

A risk factor includes at least one of a pedestrian, a bicycle, a motorcycle, an oncoming vehicle, and a parked vehicle each of which exists ahead of the vehicle.

The processor is configured to execute:
deceleration assist control that automatically decelerates the vehicle before the deceleration target based on the driving environment information;
risk avoidance control that automatically performs at least one of steering and deceleration of the vehicle to avoid the risk factor based on the driving environment information; and
a notification process that notifies a driver of the vehicle of the deceleration target or the risk factor.

The notification process includes a first notification process that notifies the driver of not the deceleration target but the risk factor in a first period.

The first period includes a period in which both the deceleration assist control and the risk avoidance control operate concurrently and a degree of urgency of the deceleration assist control is less than a threshold.

A third aspect further has the following feature in addition to the second aspect.

The notification process further includes a second notification process that notifies the driver of not the risk factor but the deceleration target in a second period.

The second period includes a period in which both the deceleration assist control and the risk avoidance control operate concurrently and the degree of urgency of the deceleration assist control is equal to or greater than the threshold.

A fourth aspect further has the following feature in addition to the second or third aspect.

A situation in which the degree of urgency of the deceleration assist control is less than the threshold includes any of:

a situation in which a time for the vehicle to reach the deceleration target is equal to or greater than a first threshold;

a situation in which a distance between the vehicle and the deceleration target is equal to or greater than a second threshold; and a situation in which a first deceleration required by the deceleration assist control is less than a maximum realizable deceleration.

A fifth aspect further has the following feature in addition to any one of the first to fourth aspects.

When the deceleration assist control and the risk avoidance control concurrently operate, the deceleration assist control requires a first deceleration, and the risk avoidance control requires a second deceleration, the processor decelerates the vehicle at a higher one of the first deceleration and the second deceleration.

According to the first aspect, the driver is notified of not the deceleration target but the risk factor in the period in which both the deceleration assist control and the risk avoidance control operate concurrently. Since both the deceleration target and the risk factor are not notified at the same time, the driver's sense of annoyance caused by information overload is reduced. In addition, since the risk factor being more important to the driver is notified, the driver's sense of uneasiness about the notification is reduced. That is, it is possible to reduce the driver's senses of annoyance and uneasiness about the notification in the case where the deceleration assist control and the risk avoidance control operate concurrently.

According to the second aspect, the driver is notified of not the deceleration target but the risk factor, in the first period in which both the deceleration assist control and the risk avoidance control operate concurrently and the degree of urgency of the deceleration assist control is less than the threshold. Since both the deceleration target and the risk factor are not notified at the same time, the driver's sense of annoyance caused by information overload is reduced. In addition, since not the deceleration target with low urgency but the risk factor being more important to the driver is notified, the driver's sense of uneasiness about the notification is reduced. That is, it is possible to reduce the driver's senses of annoyance and uneasiness about the notification in the case where the deceleration assist control and the risk avoidance control operate concurrently.

According to the third aspect, the driver is notified of the deceleration target in the second period in which both the deceleration assist control and the risk avoidance control operate concurrently and the degree of urgency of the deceleration assist control is equal to or greater than the threshold. Since the deceleration target with low urgency is not notified and only the deceleration target with high urgency is notified to the driver, the driver's senses of annoyance and uneasiness about the notification are reduced.

According to the fourth aspect, the same effect as that of the second or third aspect can be obtained.

According to the fifth aspect, deceleration control is appropriately executed in the case where both the deceleration assist control and the risk avoidance control operate concurrently.

EMBODIMENTS

Embodiments of the present disclosure will be described below with reference to the accompanying drawings.

1. Outline

Figure 1:
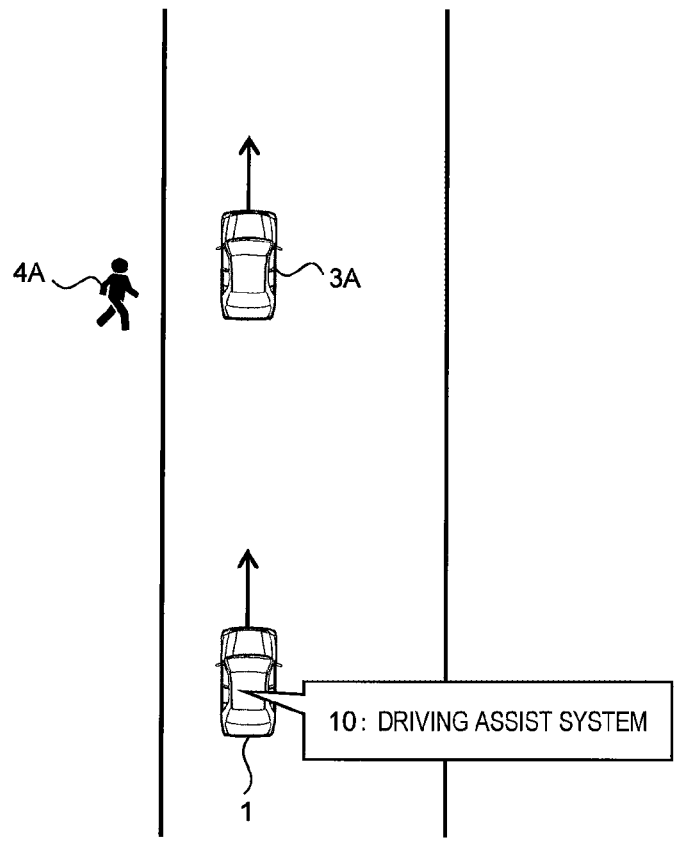
FIG. 1 is a conceptual diagram for explaining an outline of a driving assist system according to an embodiment of the present disclosure.

FIG. 1 is a conceptual diagram for explaining an outline of a driving assist system 10 according to the present embodiment. The driving assist system 10 executes "driving assist control" that assists driving of a vehicle 1. Typically, the driving assist system 10 is installed on the vehicle 1. Alternatively, at least a part of the driving assist system 10 may be disposed in an external device outside the vehicle 1 and remotely execute the driving assist control. That is, the driving assist system 10 may be distributed in the vehicle 1 and the external device.

An example of the driving assist control is "deceleration assist control" that automatically decelerates the vehicle 1 as necessary. For example, as shown in FIG. 1, a preceding vehicle 3A exists ahead of the vehicle 1. If a braking operation by a driver of the vehicle 1 is delayed, the deceleration assist control automatically decelerates the vehicle 1 before the vehicle 1 reaches the preceding vehicle 3A.

Another example of the driving assist control is "risk avoidance control" for avoiding a risk factor ahead of the vehicle 1. For example, as shown in FIG. 1, a pedestrian 4A exists in a road shoulder ahead of the vehicle 1. The pedestrian 4A may go into a roadway from the road shoulder. Therefore, the pedestrian 4A present in the road shoulder ahead of the vehicles 1 is a risk factor. The risk avoidance control automatically performs steering of the vehicle 1 so as to avoid the pedestrian 4A in advance. More specifically, the risk avoidance control steers the vehicle 1 in a direction away from the pedestrian 4A.

When the driving assist control operates (is activated), the driving assist system 10 notifies the driver of the vehicle 1 of the driving assist control being in operation. For example, when the deceleration assist control operates with respect to the preceding vehicle 3A, the driving assist system 10 notifies the driver of the preceding vehicle 3A. Similarly, when the risk avoidance control operates with respect to the pedestrian 4A, the driving assist system 10 notifies the driver of the pedestrian 4A.

Next, a case where both the deceleration assist control and the risk avoidance control operate concurrently is considered. At this time, if both the preceding vehicle 3A and the pedestrian 4A are notified to the driver at the same time, the driver may feel a sense of annoyance due to information overload. In view of the above, the driving assist system 10 according to the present embodiment notifies the driver of only one of the preceding vehicle 3A and the pedestrian 4A. This makes it possible to reduce the driver's sense of annoyance caused by information overload.

In addition, a position of the preceding vehicle 3A triggering the deceleration assist control is a position through which the vehicle 1 is highly likely to pass immediately thereafter. In other words, the preceding vehicle 3A is an imminent risk for the vehicle 1. If the driver is not notified of the preceding vehicle 3A despite that the driver perceives the preceding vehicle 3A, the driver may feel a sense of uneasiness. In view of the above, the driving assist system 10 according to the present embodiment preferentially notifies the driver of the preceding vehicle 3A rather than the pedestrian 4A. This makes it possible to reduce the driver's sense uneasiness about the notification in the case where the deceleration assist control and the risk avoidance control operate concurrently.

Hereinafter, the driving assist system 10 according to the present embodiment will be described in more detail.

2. Configuration Example of Driving Assist System

Figure 2:
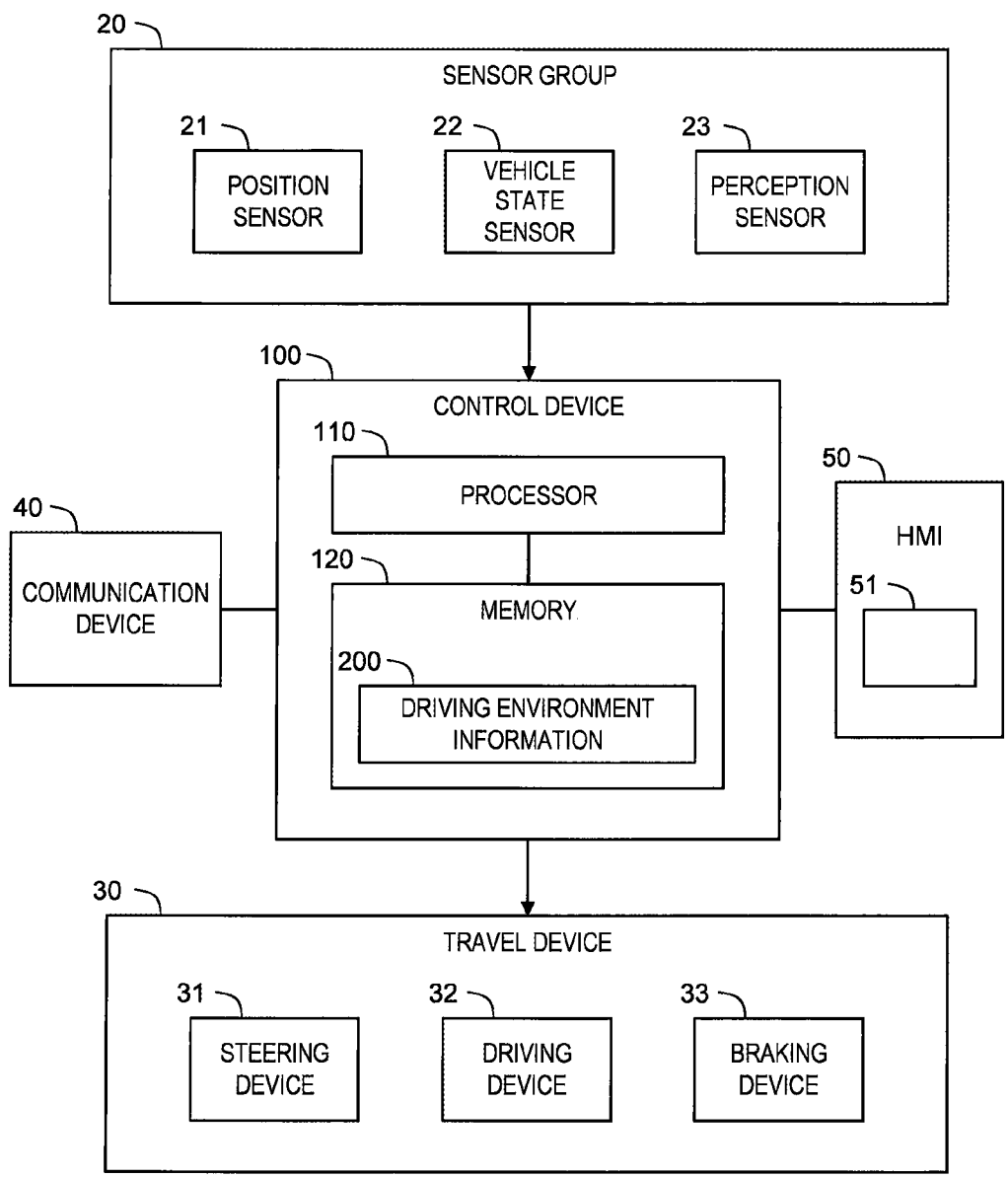
FIG. 2 is a block diagram showing a configuration example of a vehicle and the driving assist system according to an embodiment of the present disclosure.

FIG. 2 is a block diagram showing a configuration example of the driving assist system 10 according to the present embodiment. The driving assist system 10 includes a sensor group 20, a travel device 30, a communication device 40, an HMI (Human Machine Interface) 50, and a control device (controller) 100.

The sensor group 20 includes a position sensor 21, a vehicle state sensor 22, a perception (recognition) sensor 23, and the like. The position sensor 21 detects a position and an orientation of the vehicle 1. As the position sensor 21, a GPS (Global Positioning System) sensor is exemplified. The vehicle state sensor 22 detects a state of the vehicle 1. Examples of the vehicle state sensor 22 include a vehicle speed sensor, a yaw rate sensor, a lateral acceleration sensor, a steering angle sensor, and the like. The perception sensor 23 perceives (detects) a situation around the vehicle 1. Examples of the perception sensor 23 include a camera, a LIDAR (Laser Imaging Detection and Ranging), a radar, a sonar, and the like.

The travel device 30 includes a steering device 31, a driving device 32, and a braking device 33. The steering device 31 turns (i.e., changes a direction of) a wheel of the vehicle 1. For example, the steering device 31 includes a power steering (EPS: Electric Power Steering) device. The driving device 32 is a power source that generates a driving force. Examples of the driving device 32 include an engine, an electric motor, an in-wheel motor, and the like. The braking device 33 generates a braking force.

The communication device 40 communicates with the outside of the vehicle 1. For example, the communication device 40 communicates with a management server outside of the vehicle 1 via a communication network. The communication device 40 may perform V2I communication (vehicle-to-infrastructure communication) with a surrounding infrastructure. The communication device 40 may perform V2V communication (vehicle-to-vehicle communication) with a surrounding vehicle.

The HMI 50 is an interface for providing information to the driver of the vehicle 1 and receiving information from the driver. More specifically, the HMI 50 includes an input device and an output device. Examples of the input device include a touch panel, a switch, a microphone, and the like. Examples of the output device include a display device 51, a speaker, and the like. Examples of the display device 51 include a display installed in an instrument panel, a head-up display (HUD), and the like.

The control device (controller) 100 controls the vehicle 1. The control device 100 is also called an ECU (Electronic Control Unit). The control device 100 includes a processor 110 and a memory 120. The processor 110 executes a variety of processing. The memory 120 stores a variety of information. Examples of the memory 120 include a volatile memory, a nonvolatile memory, and the like. The variety of processing by the processor 110 is achieved by the processor 110 executing a control program being a computer program. The control program is stored in the memory 120 or recorded on a computer-readable recording medium.

For example, the processor 110 (the control device 100) acquires driving environment information 200 indicating a driving environment for the vehicle 1. The driving environment information 200 is stored in the memory 120.

Figure 3:
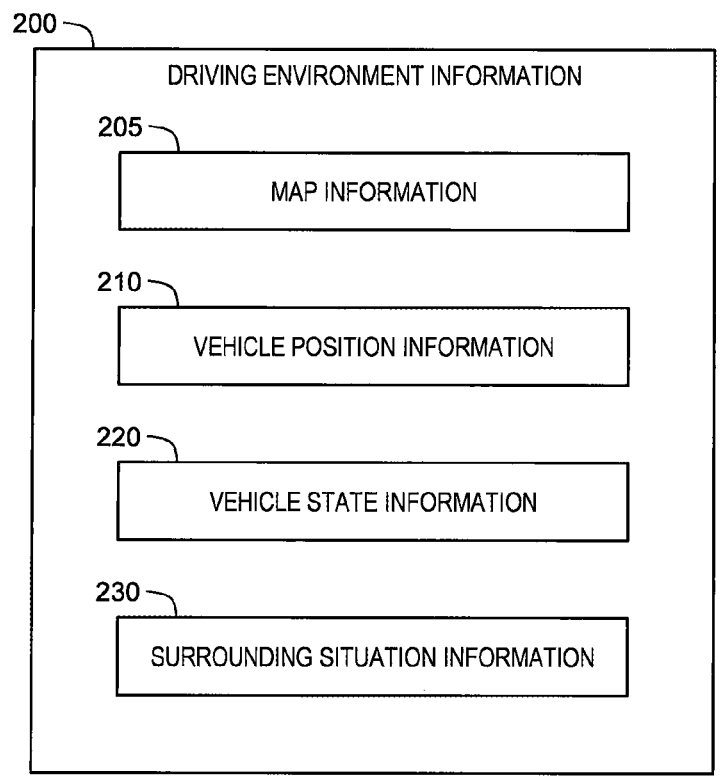
FIG. 3 is a block diagram showing an example of driving environment information in an embodiment of the present disclosure.

FIG. 3 is a block diagram showing an example of the driving environment information 200. The driving environment information 200 includes map information 205, vehicle position information 210, vehicle state information 220, surrounding situation information 230, and the like.

The map information 205 indicates a lane configuration, a road shape, and the like. The map information 205 may further indicate positions (absolute positions) of stop lines, mandatory stop lines, traffic signals, and the like. The control device 100 acquires the map information 205 of a necessary area from a map database. The map database may be stored in a predetermined storage device installed on the vehicle 1, or may be stored in a management server outside the vehicle 1. In the latter case, the control device 100 communicates with the management server via the communication device 40 to acquire the necessary map information 205.

The vehicle position information 210 is information indicating the position and the orientation of the vehicle 1. The processor 110 acquires the vehicle position information 210 from a result of detection by the position sensor 21.

The vehicle state information 220 is information indicating the state of the vehicle 1. Examples of the state of the vehicle 1 include a vehicle speed, a yaw rate, a lateral acceleration, a steering angle, and the like. The processor 110 acquires the vehicle state information 220 from a result of detection by the vehicle state sensor 22.

The surrounding situation information 230 is information indicating the situation around the vehicle 1. The surrounding situation information 230 includes information acquired by the perception sensor 23. For example, the surrounding situation information 230 includes an image captured by the camera and indicating a situation around the vehicle 1. As another example, the surrounding situation information 230 includes information measured by the LIDAR and the radar.

Further, the surrounding situation information 230 includes information on objects around the vehicle 1. Examples of the object around the vehicle 1 include a surrounding vehicle (e.g., a preceding vehicle, an oncoming vehicle, a parked vehicle), a pedestrian, a bicycle, a motorcycle, a sign, a white line, a stop line, a mandatory stop line, a traffic signal, a roadside structure (e.g., a guardrail, a curb), and the like.

The surrounding vehicle (e.g., a preceding vehicle, an oncoming vehicle, a parked vehicle) is perceived by the perception sensor 23. For example, the surrounding vehicle is perceived by at least one of the camera, the LIDAR, and the radar. Information on the surrounding vehicle includes a relative position and a relative speed of the surrounding vehicle with respect to the vehicle 1. The processor 110 calculates the relative position and the relative speed of the surrounding vehicle based on the result of perception by the perception sensor 23. Moreover, the processor 110 may perform the V2V communication with the surrounding vehicle through the communication device 40 to acquire information on a position and a vehicle speed of the surrounding vehicle. The relative position and the relative speed of the surrounding vehicle can be calculated by combining the position (the vehicle position information 210) and the vehicle speed (the vehicle state information 220) of the vehicle 1 with the position and the vehicle speed of the surrounding vehicle.

The pedestrian also is perceived by the perception sensor 23 in the same manner as the surrounding vehicle. Information on the pedestrian includes a relative position and a relative speed of the pedestrian with respect to the vehicle 1. The processor 110 calculates the relative position and the relative speed of the pedestrian based on the result of perception by the perception sensor 23. The information on the pedestrian may include a direction of movement and a moving speed of the pedestrian. The processor 110 calculates the direction of movement and the moving speed of the pedestrian based on the result of perception by the perception sensor 23. The bicycle and the motorcycle also are perceived in the same manner as the pedestrian.

It should be noted that the surrounding vehicle, the pedestrian, the bicycle, and the motorcycle are distinguished from each other. For example, analyzing the image captured by the camera makes it possible to distinguish the surrounding vehicle, the pedestrian, the bicycle, and the motorcycle from each other. The image analysis includes, for example, pattern recognition using machine learning.

The sign is perceived by the perception sensor 23. For example, the sign is perceived and identified by analyzing the image captured by the camera. Information on the sign includes a relative position of the sign with respect to the vehicle 1. The processor 110 calculates the relative position of the sign based on the result of perception by the perception sensor 23. The information on the sign may further include a meaning of the sign (e.g., mandatory stop). The processor 110 can recognize the meaning of the sign by analyzing the image captured by the camera.

The white line (road marking line), the stop line, and the mandatory stop line (hereinafter referred to as "white line group") are perceived by the perception sensor 23. For example, the white line group is perceived and identified by analyzing the image captured by the camera. A mandatory stop sign instructing to stop and/or a character road marking "STOP" may be placed in the vicinity of the mandatory stop line. In that case, the mandatory stop line can be perceived and identified by perceiving the mandatory stop sign and/or the character road marking. Information on the white line group includes a relative position of the white line group with respect to the vehicle 1. The processor 110 calculates the relative position of the white line group based on the result of perception by the perception sensor 23. As another example, the map information 205 including the absolute positions of the stop lines and the mandatory stop lines may be used. Based on the vehicle position information 210 and the map information 205, the processor 110 can recognize a stop line and/or a mandatory stop line around the vehicle 1 and calculate the relative position thereof.

The traffic signal is perceived by the perception sensor 23. For example, the traffic signal and its color (signal indication) are perceived and identified by analyzing the image captured by the camera. Information on the traffic signal includes a relative position of the traffic signal with respect to the vehicle 1. The processor 110 calculates the relative position of the traffic signal based on the result of perception by the perception sensor 23. As another example, the map information 205 including the absolute positions of the traffic signals may be used. Based on the vehicle position information 210 and the map information 205, the processor 110 can recognize a traffic signal around the vehicle 1 and calculate the relative position of the traffic signal. The information on the traffic signal may further include the color of the traffic signal. The processor 110 can recognize the color of the traffic signal by analyzing the image captured by the camera.

The roadside structure (e.g., a guardrail, a curb) is perceived by the perception sensor 23. Information on the roadside structure includes a relative position of the roadside structure with respect to the vehicle 1. The processor 110 calculates the relative position of the roadside structure based on the result of perception by the perception sensor 23.

Moreover, the processor 110 (the control device 100) executes "vehicle travel control" that controls travel of the vehicle. The vehicle travel control includes steering control for controlling steering of the vehicle 1, acceleration control for controlling acceleration of the vehicle 1, and deceleration control for controlling deceleration of the vehicle 1. The processor 110 executes the vehicle travel control by controlling the travel device 30. More specifically, the processor 110 executes the steering control by controlling the steering device 31. The processor 110 executes the acceleration control by controlling the driving device 32. The processor 110 executes the deceleration control by controlling the braking device 33.

The vehicle travel control is executed in the driving assist control that assists driving of the vehicle 1. The processor 110 (the control device 100) executes the driving assist control based on the driving environment information 200 described above. The driving assist control includes the "deceleration assist control" and the "risk avoidance control." Hereinafter, the deceleration assist control and the risk avoidance control will be described in more detail.

3. Deceleration Assist Control

The deceleration assist control is the deceleration control for automatically decelerating the vehicle 1 as necessary. It is a "deceleration target 3" existing ahead of the vehicle 1 that triggers the deceleration assist control. The deceleration assist control automatically decelerates the vehicle 1 before the deceleration target 3. In other words, the deceleration assist control automatically decelerates the vehicle 1 before the vehicle 1 reaches the deceleration target 3.

Figure 4:
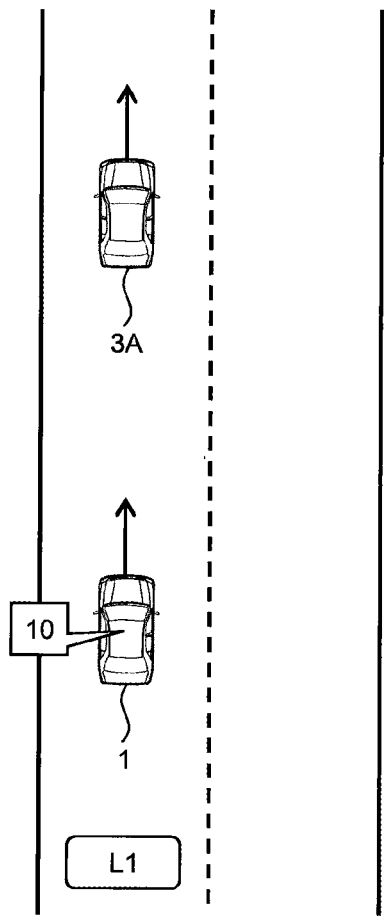
FIG. 4 is a conceptual diagram for explaining an example of deceleration assist control according to an embodiment of the present disclosure.

FIG. 4 is a conceptual diagram for explaining an example of the deceleration assist control. The vehicle 1 travels in a first lane L1. A preceding vehicle 3A exists in the first lane L1 ahead of the vehicle 1. Since there is a possibility that the vehicle 1 collides with the preceding vehicle 3A, the preceding vehicle 3A is the deceleration target 3. For example, if a braking operation by the driver is delayed, the possibility that the vehicle 1 collides with the preceding vehicle 3A increases. In order to prevent the collision with the preceding vehicle 3A from occurring, the deceleration assist control automatically decelerates the vehicle 1 before the vehicle 1 reaches the preceding vehicle 3A.

Figure 5:
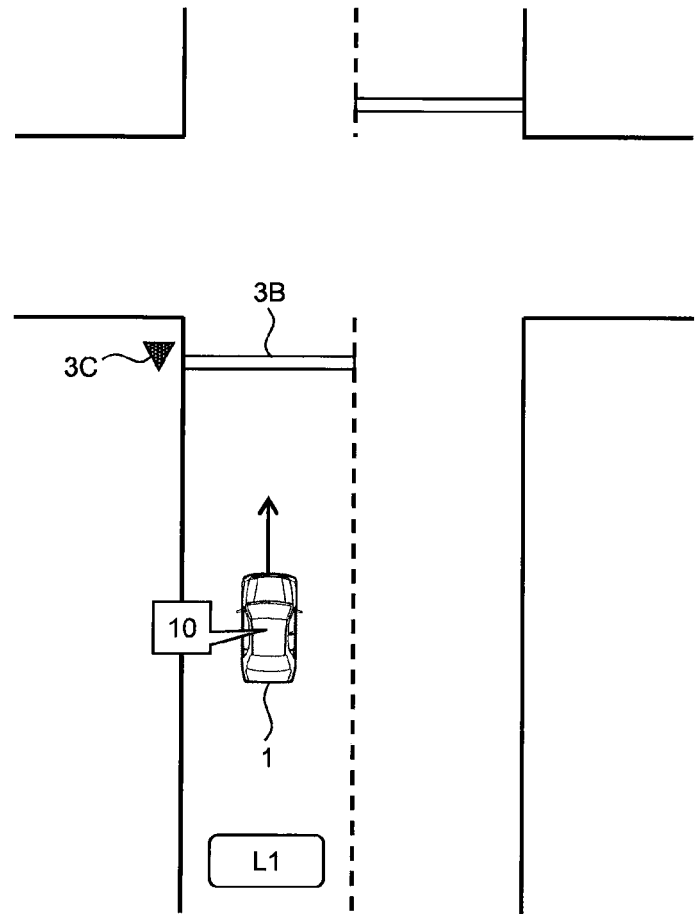
FIG. 5 is a conceptual diagram for explaining another example of the deceleration assist control according to an embodiment of the present disclosure.

FIG. 5 is a conceptual diagram for explaining another example of the deceleration assist control. A mandatory stop line 3B exists in the first lane L1 ahead of the vehicle 1. The vehicle 1 is required to stop before the mandatory stop line 3B. Therefore, the mandatory stop line 3B is the deceleration target 3. For example, if a braking operation by the driver is delayed, the vehicle 1 may cross the mandatory stop line 3B without stopping or at a relatively high speed. In order to prevent such the situation from occurring, the deceleration assist control automatically decelerates the vehicle 1 before the mandatory stop line 3B. In one embodiment, the deceleration assist control makes the vehicle 1 stop at a position a predetermined distance before the mandatory stop line 3B. Alternatively, the vehicle 1 may pass through the mandatory stop line 3B in a sufficiently decelerated state without being completely stopped.

As shown in FIG. 5, there is also a case where a mandatory stop sign 3C instructing to stop is placed in the vicinity of the mandatory stop line 3B. The mandatory stop sign 3C indicates the presence of the mandatory stop line 3B. Therefore, the mandatory stop sign 3C also is the deceleration target 3 similarly to the mandatory stop line 3B. In this case, the position of the deceleration target 3 may be the position of the mandatory stop sign 3C or may be a position of an imaginary mandatory stop line estimated based on the position of the mandatory stop sign 3C.

Figure 6:
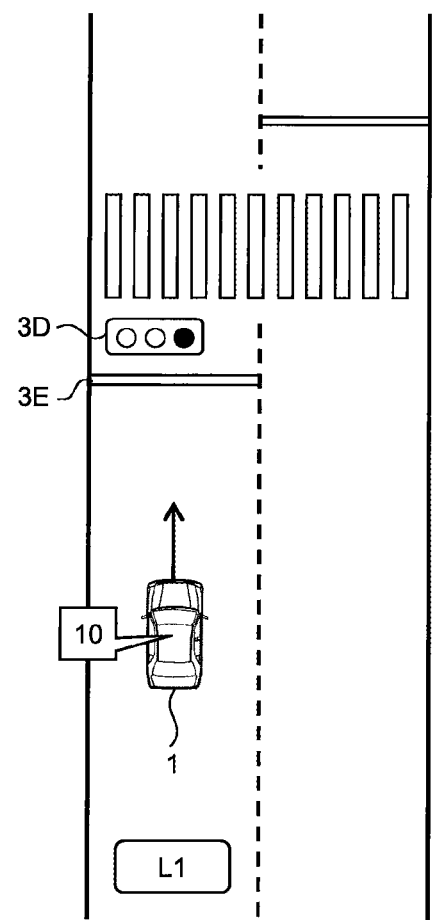
FIG. 6 is a conceptual diagram for explaining still another example of the deceleration assist control according to an embodiment of the present disclosure.

FIG. 6 is a conceptual diagram for explaining still another example of the deceleration assist control. A traffic signal 3D exists ahead of the vehicle 1. A stop line 3E exists before the traffic signal 3D. When the traffic signal 3D is a red light, the vehicle 1 is required to stop before the stop line 3E. Therefore, the traffic signal 3D and the stop line 3E each is the deceleration target 3. For example, when a braking operation by the driver is delayed, the vehicle 1 may cross the stop line 3E without stopping. In order to prevent such the situation from occurring, the deceleration assist control automatically decelerates the vehicle 1 before the traffic signal 3D (particularly, red light) and the stop line 3E.

Figure 7:
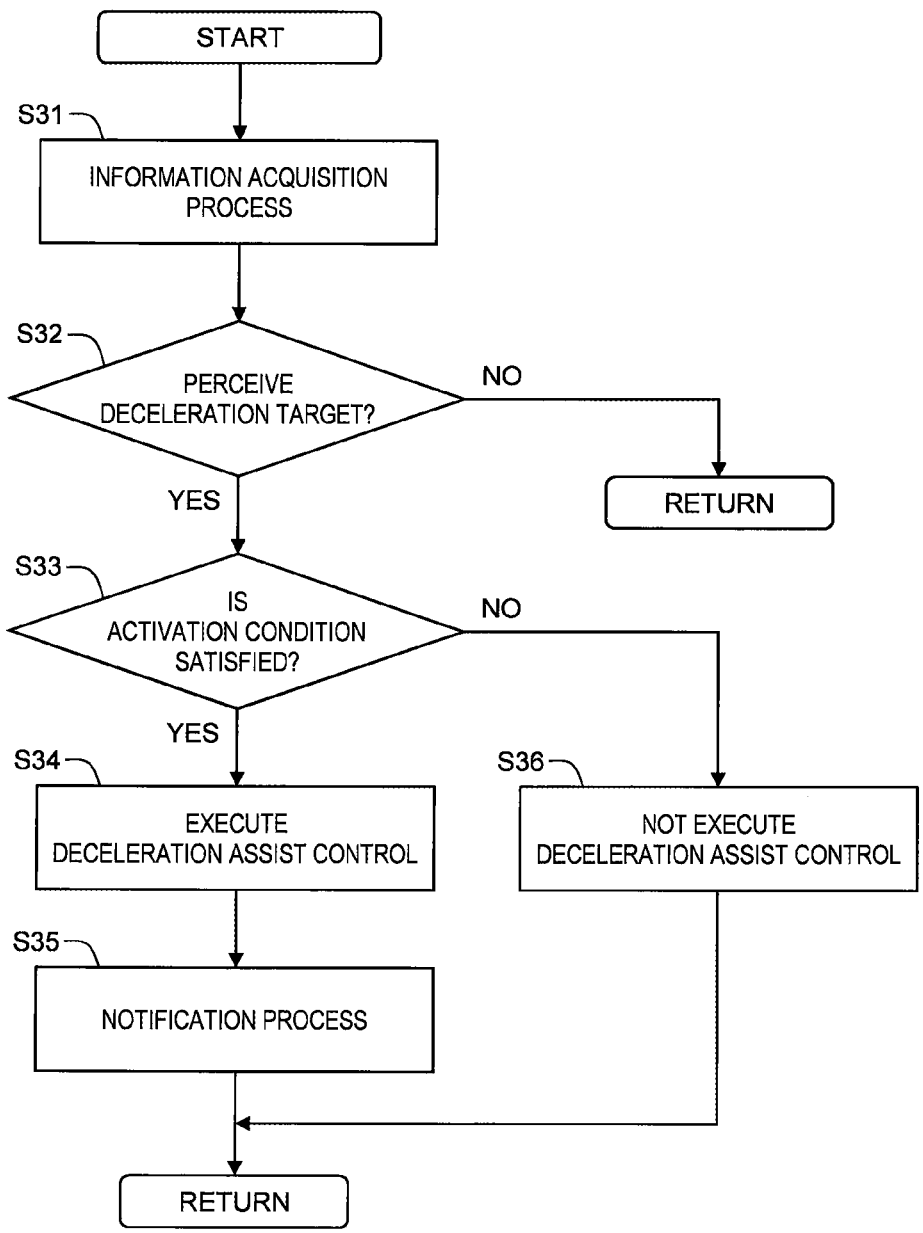
FIG. 7 is a flow chart showing processing related to the deceleration assist control according to an embodiment of the present disclosure.

FIG. 7 is a flow chart showing processing related to the deceleration assist control according to the present embodiment. The process flow shown in FIG. 7 is repeatedly executed at a predetermined cycle.

In Step S31, the processor 110 acquires the driving environment information 200 described above. The driving environment information 200 is stored in the memory 120. After that, the processing proceeds to Step S32.

In Step S32, the processor 110 determines whether or not the deceleration target 3 ahead of the vehicle 1 is perceived based on the surrounding situation information 230. The deceleration target 3 includes at least one of the preceding vehicle 3A, the mandatory stop line 3B, the mandatory stop sign 3C, the traffic signal 3D (particularly, the red light), and the stop line 3E before the traffic signal 3D, each of which exists ahead of the vehicle 1. When the deceleration target 3 ahead of the vehicle 1 is perceived (Step S32; Yes), the processing proceeds to Step S33. Otherwise (Step S32; No), the processing returns to Step S31.

In Step S33, the processor 110 determines whether or not an activation condition (a first activation condition) of the deceleration assist control is satisfied. An example of the activation condition of the deceleration assist control is that a time for the vehicle 1 to reach the deceleration target 3 is less than a predetermined time threshold. When the deceleration target 3 is the preceding vehicle 3A, the time for the vehicle 1 to reach the preceding vehicle 3A is also referred to as a TTC (Time to Collision). Another example of the activation condition of the deceleration assist control is that a distance between the vehicle 1 and the deceleration target 3 is less than a predetermined distance threshold. The activation condition of the deceleration assist control may further include that the vehicle speed of the vehicle 1 is equal to or higher than a certain speed.

The processor 110 determines whether or not the activation condition of the deceleration assist control is satisfied based on the driving environment information 200. More specifically, the vehicle state information 220 includes the vehicle speed of the vehicle 1. The surrounding situation information 230 includes the information (the relative position and the relative speed) regarding the perceived deceleration target 3. Therefore, the processor 110 can determine whether or not the activation condition of the deceleration assist control is satisfied based on the vehicle state information 220 and the surrounding situation information 230. When the activation condition of the deceleration assist control is satisfied (Step S33; Yes), the processing proceeds to Step S34. On the other hand, when the activation condition of the deceleration assist control is not satisfied (Step S33; No), the processing proceeds to Step S36.

In Step S34, the processor 110 executes the deceleration assist control. That is, the processor 110 activates the deceleration assist control to automatically decelerate the vehicle 1 before the deceleration target 3.

More specifically, the processor 110 sets a target speed. The target speed may be a constant speed or may be set according to a type of the deceleration target 3. For example, when the deceleration target 3 is the preceding vehicle 3A, the target speed is set such that the relative speed between the vehicle 1 and the preceding vehicle 3A becomes 0. As another example, when the deceleration target 3 is the mandatory stop line 3B or the mandatory stop sign 3C, the target speed is set to 0 km/h or an extremely low speed. As still another example, when the deceleration target 3 is the traffic signal 3D (red light) or the stop line 3E, the target speed is set to 0 km/h.

Subsequently, the processor 110 calculates a "first deceleration D1" required for the vehicle 1 to decelerate to the target speed before reaching the deceleration target 3. For example, when the deceleration target 3 is the preceding vehicle 3A, the first deceleration D1 is a deceleration required for the vehicle 1 to decelerate to the target speed within a time shorter than the TTC. As another example, when the deceleration target 3 is the mandatory stop line 3B, the first deceleration D1 is a deceleration required for the vehicle 1 to stop at a position a predetermined distance before the mandatory stop line 3B. The vehicle speed of the vehicle 1 is obtained from the vehicle state information 220. The distance between the vehicle 1 and the deceleration target 3 is obtained from the surrounding situation information 230. Therefore, the processor 110 can calculate the first deceleration D1 based on the vehicle state information 220 and the surrounding situation information 230.

Then, the processor 110 controls the braking device 33, that is, executes the deceleration control so that the vehicle 1 decelerates at the first deceleration D1.

Moreover, Step S35 (notification process) is executed in conjunction with Step S34. In Step S35, the processor 110 notifies the driver of the vehicle 1 of the deceleration assist control being in operation. In particular, the processor 110 notifies the driver of the operation of the deceleration assist control by notifying the driver of the deceleration target 3. Typically, the processor 110 notifies the driver of the deceleration target 3 by displaying the deceleration target 3 on the display device 51. In addition to the displaying, the processor 110 may notify the driver of the deceleration target 3 by voice through the speaker.

Figure 8:
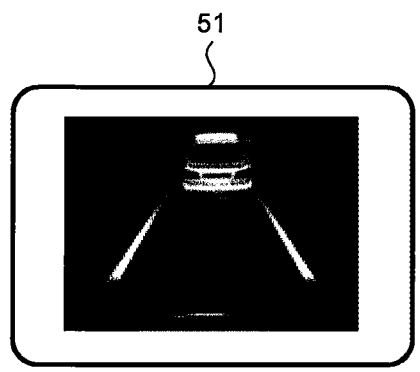
FIG. 8 is a conceptual diagram showing an example of an icon displayed on a display device when a deceleration target of the deceleration assist control is a preceding vehicle.

FIG. 8 shows an example of the notification (icon) displayed on the display device 51 when the deceleration target 3 is the preceding vehicle 3A. The icon indicates the preceding vehicle 3A. The icon displayed on the display device 51 may be different for each type of the deceleration target 3.

In Step S36, the processor 110 does not execute the deceleration assist control. That is, the processor 110 does not activate the deceleration assist control. When the deceleration assist control is already in execution, the processor 110 terminates the deceleration assist control.

4. Risk Avoidance Control

The risk avoidance control is a control for avoiding a "risk factor 4" ahead of the vehicle 1. In order to avoid the risk factor 4 ahead of the vehicle 1, the risk avoidance control automatically performs at least one of steering and deceleration of the vehicle 1.

Figure 9:
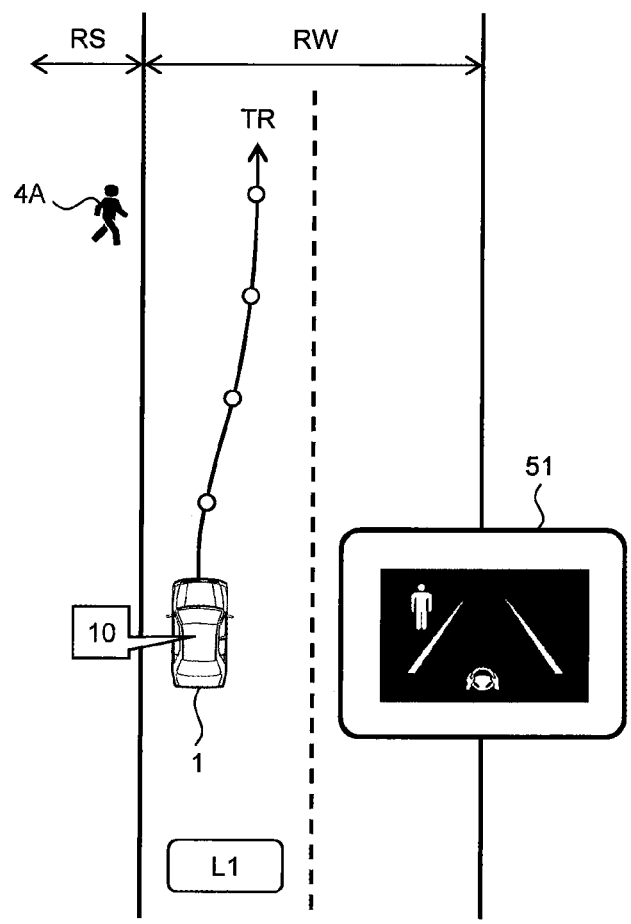
FIG. 9 is a conceptual diagram for explaining an example of risk avoidance control according to an embodiment of the present disclosure.

FIG. 9 is a conceptual diagram for explaining an example of the risk avoidance control. The vehicle 1 travels in a first lane L1 in a roadway RW. A road shoulder RS is adjacent to the first lane L1. A pedestrian 4A existing in the road shoulder RS ahead of the vehicle 1 may go into the roadway RW (i.e., the first lane L1). Therefore, the pedestrian 4A existing in the road shoulder RS ahead of the vehicle 1 is the risk factor 4. The risk avoidance control automatically performs steering of the vehicle 1 so as to avoid the pedestrian 4A in advance. More specifically, the risk avoidance control steers the vehicle 1 in a direction away from the pedestrian 4A. It should be noted that the pedestrian 4A may be replaced with a bicycle or a motorcycle. In addition, in the present specification, the road shoulder RS is a concept including a side strip.

Figure 10:
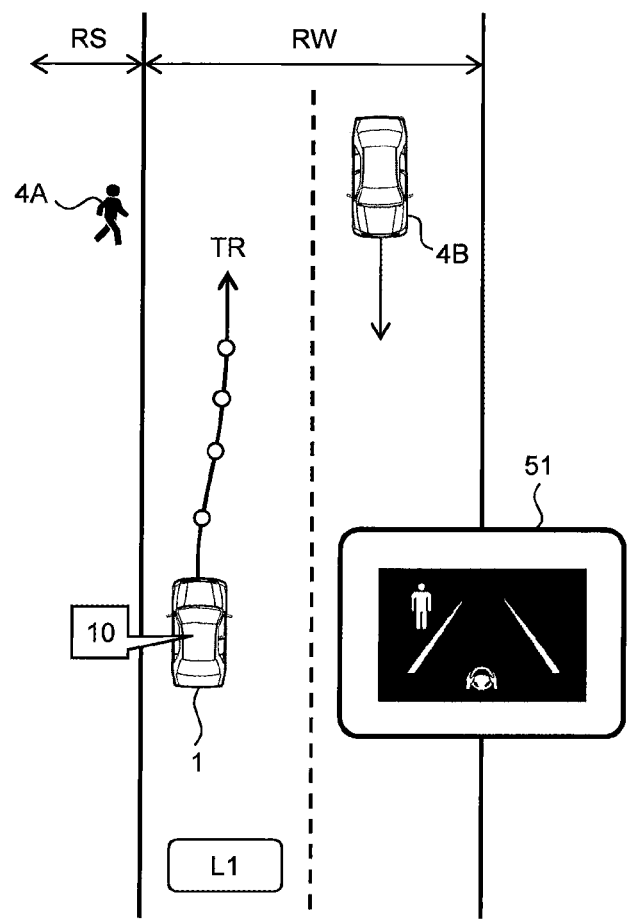
FIG. 10 is a conceptual diagram for explaining another example of the risk avoidance control according to an embodiment of the present disclosure.

FIG. 10 is a conceptual diagram for explaining another example of the risk avoidance control. As in the case of FIG. 9, the pedestrian 4A exists in the road shoulder RS ahead of the vehicle 1. However, an oncoming vehicle 4B exists in a direction away from the pedestrian 4A. The oncoming vehicle 4B also is a kind of the risk factor 4. In this case, the risk avoidance control automatically performs steering of the vehicle 1 so as to avoid both the pedestrian 4A and the oncoming vehicle 4B. Since the oncoming vehicle 4B exists, a steering amount in the direction away from the pedestrian 4A is smaller than that in the case of the example shown in FIG. 9. When a space between the pedestrian 4A and the oncoming vehicle 4B is small, the risk avoidance control may perform deceleration of the vehicle 1.

Figure 11:
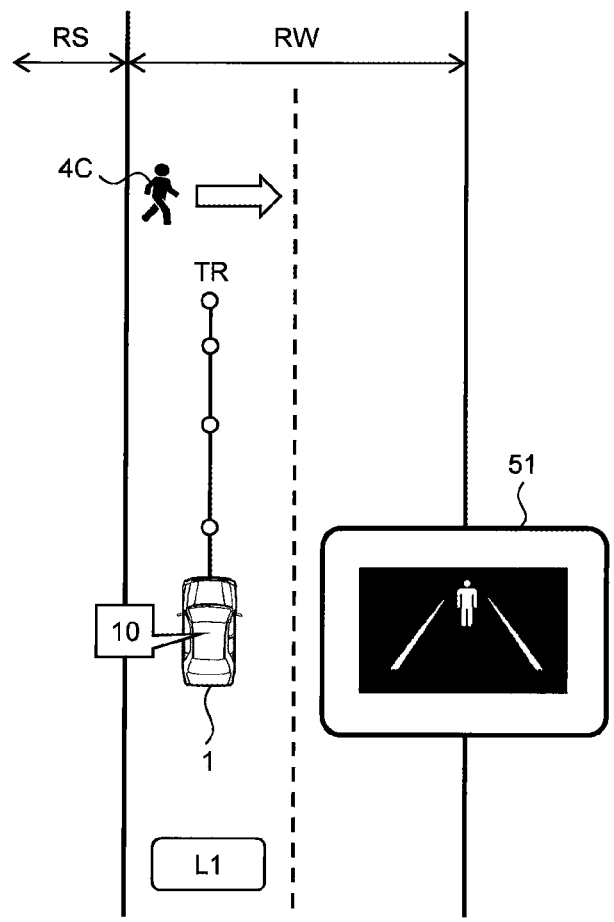
FIG. 11 is a conceptual diagram for explaining still another example of the risk avoidance control according to an embodiment of the present disclosure.

FIG. 11 is a conceptual diagram for explaining still another example of the risk avoidance control. A pedestrian 4C crosses the roadway RW (the first lane L1) ahead of the vehicle 1. The pedestrian 4C existing in the roadway RW ahead of the vehicle 1 is the risk factor 4. The risk avoidance control automatically performs deceleration of the vehicle 1 so as to avoid the pedestrian 4C. If necessary, the risk avoidance control may automatically perform steering of the vehicle 1 so as to avoid the pedestrian 4C. It should be noted that the pedestrian 4C may be replaced with a bicycle or a motorcycle.

Figure 12:
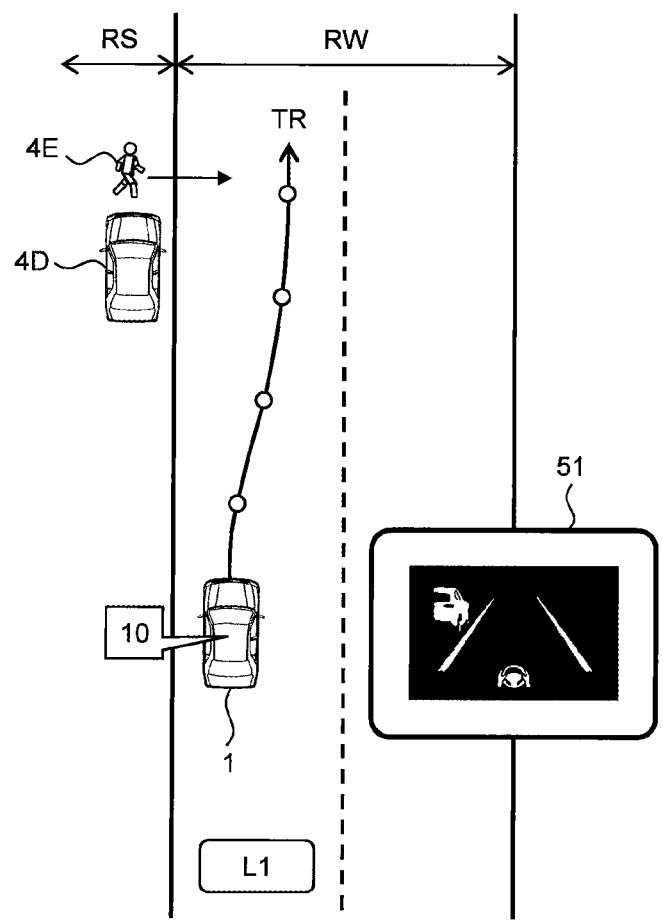
FIG. 12 is a conceptual diagram for explaining still another example of the risk avoidance control according to an embodiment of the present disclosure.

FIG. 12 is a conceptual diagram for explaining still another example of the risk avoidance control. The risk factor 4 is not limited to "manifest risks" such as the pedestrian 4A and the pedestrian 4C described above. The risk factor 4 can include a "potential risk" as well. For example, in FIG. 12, a parked vehicle 4D exists in the road shoulder RS ahead of the vehicle 1. An area ahead of the parked vehicle 4D is a blind area, and there is a possibility that a pedestrian 4E jumps out from the blind area. Therefore, the parked vehicle 4D ahead of the vehicle 1 is the risk factor 4 (the potential risk). The risk avoidance control automatically performs steering of the vehicle 1 so as to avoid the parked vehicle 4D in advance. More specifically, the risk avoidance control steers the vehicle 1 in a direction away from the parked vehicle 4D.

Figure 13:
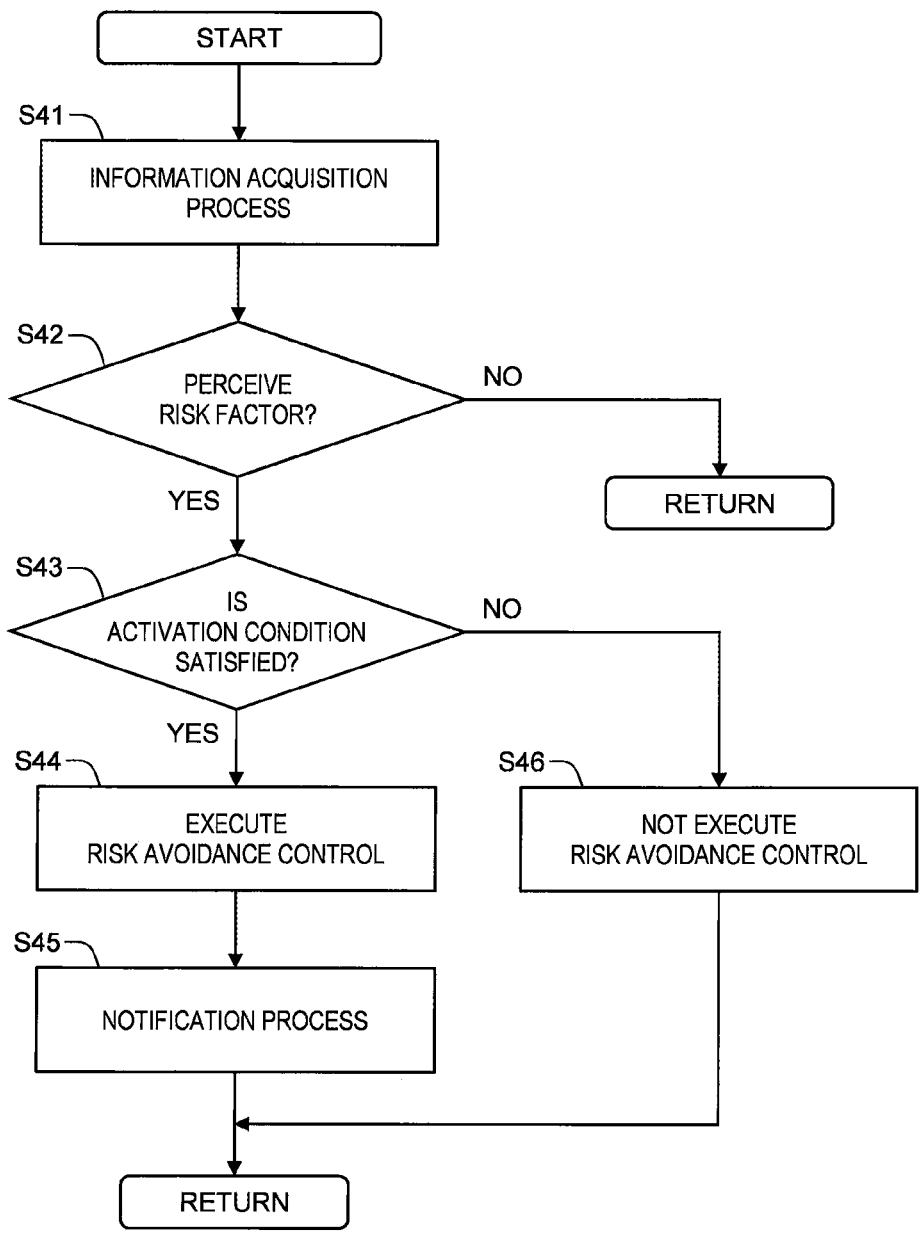
FIG. 13 is a flow chart showing processing related to the risk avoidance control according to an embodiment of the present disclosure.

FIG. 13 is a flow chart showing processing related to the risk avoidance control according to the present embodiment. The process flow shown in FIG. 13 is repeatedly executed at a predetermined cycle.

In Step S41, the processor 110 acquires the driving environment information 200 described above. The driving environment information 200 is stored in the memory 120. After that, the processing proceeds to Step S42.

In Step S42, the processor 110 determines whether or not the risk factor 4 ahead of the vehicle 1 is perceived based on the surrounding situation information 230. The risk factor 4 include at least one of the pedestrian 4A, the pedestrian 4C, a bicycle, a motorcycle, the oncoming vehicle 4B, and the parked vehicle 4D, each of which exists ahead of the vehicle 1.

It should be noted that whether the risk factor 4 exists in the roadway RW or in the road shoulder RS can be determined by comparing the position of the risk factor 4 with the position of the white line (road marking line). Alternatively, whether the risk factor 4 exists in the roadway RW or in the road shoulder RS can be determined also by comparing the position of the risk factor 4 factor with the lane configuration indicated by the map information 205.

When the risk factor 4 ahead of the vehicle 1 is perceived (Step S42; Yes), the processing proceeds to Step S43. Otherwise (Step S42; No), the processing returns to Step S41.

In Step S43, the processor 110 determines whether or not an activation condition (a second activation condition) of the risk avoidance control is satisfied. An example of the activation condition of the risk avoidance control is that a time for the vehicle 1 to reach the risk factor 4 is less than a predetermined time threshold. Another example of the activation condition of the risk avoidance control is that a distance between the vehicle 1 and the risk factor 4 is less than a predetermined distance threshold. The activation condition of the risk avoidance control may further include that the vehicle speed of the vehicle 1 is equal to or higher than a certain speed.

The processor 110 determines whether or not the activation condition of the risk avoidance control is satisfied based on the driving environment information 200. More specifically, the vehicle state information 220 includes the vehicle speed of the vehicle 1. The surrounding situation information 230 includes the information (the relative position and the relative speed) regarding the perceived risk factor 4. Therefore, the processor 110 can determine whether or not the activation condition of the risk avoidance control is satisfied based on the vehicle state information 220 and the surrounding situation information 230. When the activation condition of the risk avoidance control is satisfied (Step S43; Yes), the processing proceeds to Step S44. On the other hand, when the activation condition of the risk avoidance control is not satisfied (Step S43; No), the processing proceeds to Step S46.

In Step S44, the processor 110 executes the risk avoidance control. That is, the processor 110 activates the risk avoidance control to perform at least one of steering and deceleration of the vehicle 1.

More specifically, the processor 110 generates a target trajectory TR (see FIGS. 9 to 12) of the vehicle 1. The target trajectory TR includes a target position and a target speed of the vehicle 1 in the roadway RW. The target position and the target speed of the vehicle 1 each is a function of time. The processor 110 generates the target trajectory TR such that the vehicle 1 is able to avoid the risk factor 4.

For example, the processor 110 sets a risk area around the perceived risk factor 4. The risk area is an area through which the vehicle 1 is desired not to pass. A size of the risk area, that is, a margin from the risk factor 4 may be a constant value or may be a variable. For example, the size of the risk area may be variably set according to the vehicle speed of the vehicle 1. In that case, the risk area becomes larger as the vehicle speed becomes higher. The processor 110 generates the target trajectory TR such that the vehicle 1 does not pass through the risk area. A current position of the vehicle 1 is obtained from the vehicle position information 210. The position of the risk factor 4 is obtained from the surrounding situation information 230. The vehicle speed of the vehicle 1 is obtained from the vehicle state information 220. Therefore, the processor 110 can generate the target trajectory TR based on the driving environment information 200.

The target trajectory TR requires (requests) at least one of steering and deceleration of the vehicle 1. In the examples shown in FIGS. 9 and 10, the target trajectory TR requires steering in a direction away from the pedestrian 4A. In the example shown in FIG. 10, when the space between the pedestrian 4A and the oncoming vehicle 4B is small, the target trajectory TR may require deceleration of the vehicle 1. In the example shown in FIG. 11, the target trajectory TR requires deceleration of the vehicle 1. In the example shown in FIG. 12, the target trajectory TR requires steering in a direction away from the parked vehicle 4D.

The processor 110 executes at least one of the steering control and the deceleration control so that the vehicle 1 follows the target trajectory TR. The steering control and the deceleration control are executed based on the driving environment information 200.

More specifically, the processor 110 calculates a target steering angle required for the vehicle 1 to follow the target trajectory TR. For example, the processor 110 calculates a deviation (e.g., a lateral position deviation and a yaw angle deviation) between the vehicle 1 and the target trajectory TR based on the vehicle position information 210 and the target trajectory TR. Then, the processor 110 calculates a steering angle required for decreasing the deviation as the target steering angle. An actual steering angle is obtained from the vehicle state information 220. The processor 110 controls the steering device 31, that is, executes the steering control so that the actual steering angle follows the target steering angle.

In addition, the processor 110 calculates a "second deceleration D2" required for the vehicle 1 to follow the target trajectory TR. In other words, the processor 110 calculates the second deceleration D2 required for the vehicle speed to follow the target speed indicated by the target trajectory TR. For example, the processor 110 calculates a speed deviation between the vehicle speed and the target speed at the target position on the target trajectory TR based on the vehicle position information 210, the vehicle state information 220 (specifically, the vehicle speed), and the target trajectory TR. Further, the processor 110 calculates a deceleration required for decreasing the speed deviation as the second deceleration D2. Then, the processor 110 controls the braking device 33, that is, executes the deceleration control so that the vehicle 1 decelerates at the second deceleration D2.

Moreover, Step S45 (notification process) is executed in conjunction with Step S44. In Step S45, the processor 110 notifies the driver of the vehicle 1 of the risk avoidance control being in operation. In particular, the processor 110 notifies the driver of the operation of the risk avoidance control by notifying the driver of the risk factor 4. Typically, the processor 110 notifies the driver of the risk factor 4 by displaying the risk factor 4 on the display device 51. In addition to the displaying, the processor 110 may notify the driver of the risk factor 4 by voice through the speaker.

Examples of the notification (icon) displayed on the display device 51 also are illustrated in FIGS. 9 to 12. Each icon indicates a type of risk factor 4 (e.g., pedestrian, parked vehicle). Each icon may indicate the position of the risk factor 4. When the steering control is executed, the icon may include a picture representing a steering wheel.

In Step S46, the processor 110 does not execute the risk avoidance control. That is, the processor 110 does not activate the risk avoidance control. When the risk avoidance control is already in execution, the processor 110 terminates the risk avoidance control.

Figure 14:
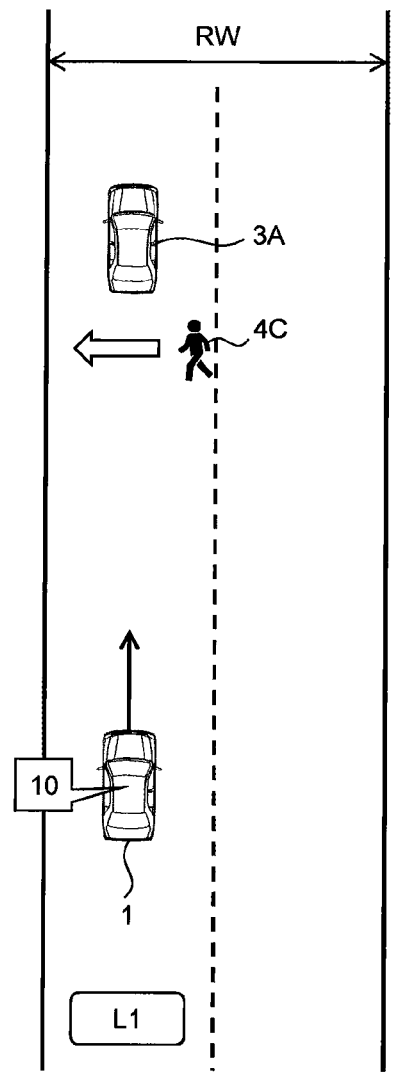
FIG. 14 is a conceptual diagram showing an example of a situation in which both the deceleration assist control and the risk avoidance control operate concurrently according to an embodiment of the present disclosure.

5. Concurrent Operation of Deceleration Assist Control and Risk Avoidance Control Next, a case where both the deceleration assist control and the risk avoidance control operate concurrently is considered. FIG. 14 shows an example of a situation in which both the deceleration assist control and the risk avoidance control operate concurrently. In the example shown in FIG. 14, both the preceding vehicle 3A (i.e., the deceleration target 3) and the pedestrian 4C (i.e., the risk factor 4) exist in the first lane L1 ahead of the vehicle 1. Therefore, there is a possibility that the deceleration assist control with respect to the preceding vehicle 3A and the risk avoidance control with respect to the pedestrian 4C operate concurrently.

Figure 15:
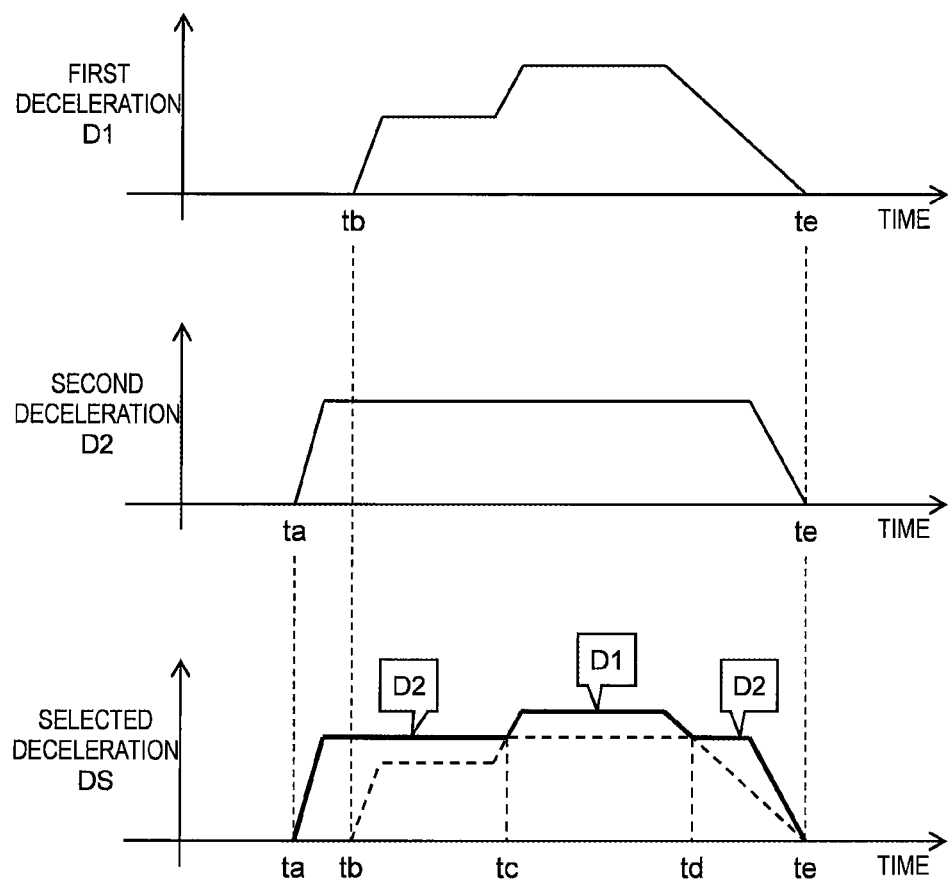
FIG. 15 is a timing chart showing an example of a deceleration profile required by the deceleration assist control and the risk avoidance control according to an embodiment of the present disclosure.

FIG. 15 is a timing chart showing an example of a deceleration profile required by the deceleration assist control and the risk avoidance control. The first deceleration D1 is a deceleration required by the deceleration assist control. The second deceleration D2 is a deceleration required by the risk avoidance control. The processor 110 selects a higher one of the first deceleration D1 and the second deceleration D2 as a selected deceleration DS. Then, the processor 110 executes the deceleration control so that the vehicle 1 decelerates at the selected deceleration DS. As a result, the deceleration control is appropriately performed even when both the deceleration assist control and the risk avoidance control operate concurrently.

For example, in a period from a time tb to a time te, the deceleration assist control operates and requires the first deceleration D1. In a period from a time ta to the time te, the risk avoidance control operates and requires the second deceleration D2. Therefore, in the period from the time tb to the time te, both the deceleration assist control and the risk avoidance control operate, and both the first deceleration D1 and the second deceleration D2 are required. In a period from the time tb to a time tc, the selected deceleration DS is the second deceleration D2. In a period from the time tc to a time td, the selected deceleration DS is the first deceleration D1. In a period from the time td to the time te, the selected deceleration DS is the second deceleration D2.

It should be noted that when the risk avoidance control includes the steering control, the steering control of the risk avoidance control is performed in parallel with the deceleration control based on the selected deceleration DS. When the risk avoidance control does not include the deceleration control but includes only the steering control, the deceleration control of the deceleration assist control and the steering control of the risk avoidance control are performed in parallel.

6. Notification Process in the Case of Concurrent Operation

Next, the notification process (Steps S35 and S45) in the case where the deceleration assist control and the risk avoidance control operate concurrently will be considered.

6-1. First Example

Figure 16:
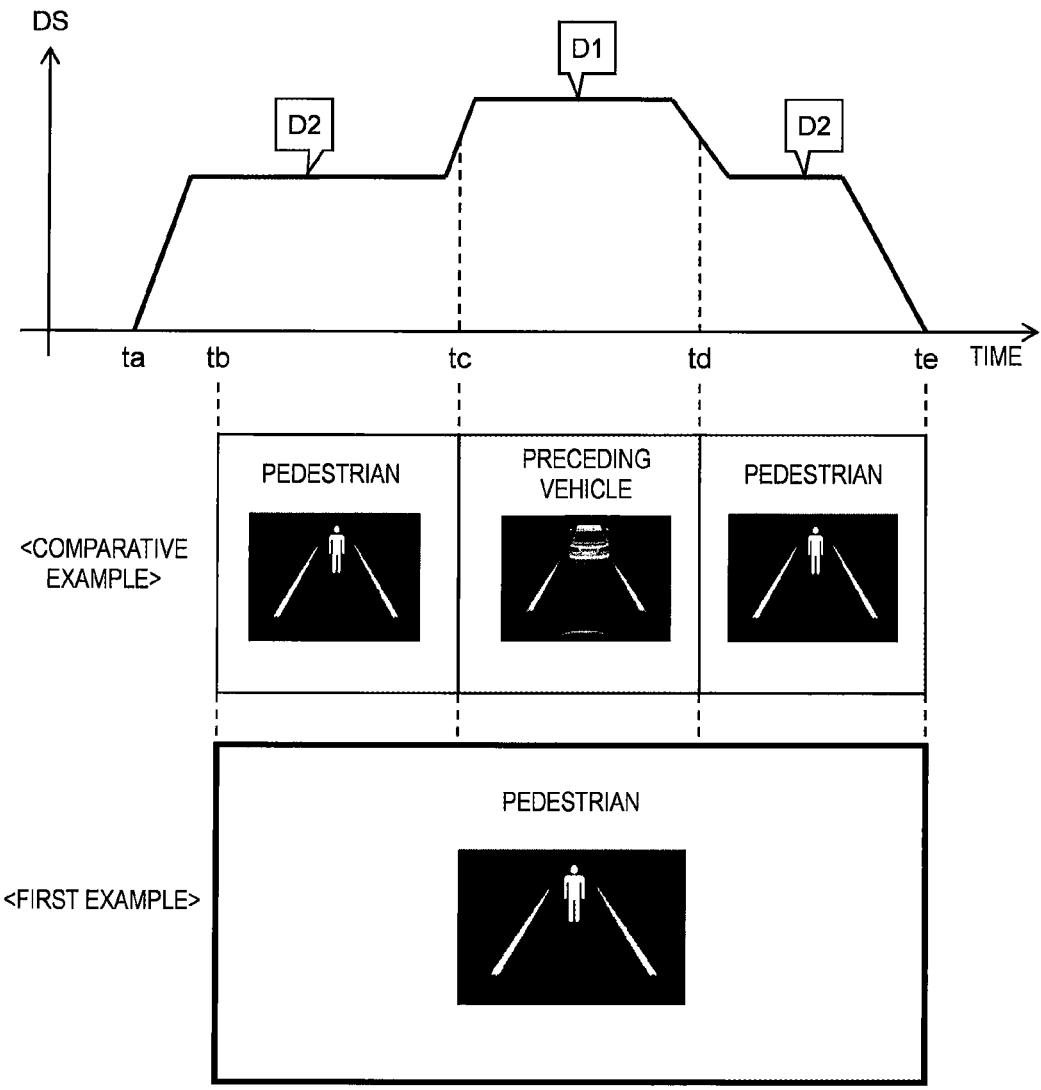
FIG. 16 is a conceptual diagram for explaining a first example of a notification process according to an embodiment of the present disclosure.

FIG. 16 is a conceptual diagram for explaining a first example of the notification process according to the present embodiment. FIG. 16 shows examples of the selected deceleration DS and the notification (icon) displayed on the display device 51 in the situation shown in FIGS. 14 and 15.

As described above, in the period from the time tb to the time te, both the deceleration assist control and the risk avoidance control operate concurrently. At this time, if both the preceding vehicle 3A (i.e., the deceleration targets 3) and the pedestrian 4C (i.e., the risk factor 4) are notified to the driver at the same time, the driver may feel a sense of annoyance due to information overload. In view of the above, the processor 110 notifies the driver of only one of the preceding vehicle 3A and the pedestrian 4C. It is thus possible to reduce the driver's sense of annoyance caused by information overload.

Which of the preceding vehicle 3A and the pedestrian 4C is to be notified is determined in accordance with the following policy.

First, a comparative example will be considered. In the case of the comparative example, only one of the deceleration assist control and the risk avoidance control that requires the selected deceleration DS is notified to the driver. Therefore, as shown in the comparative example in FIG. 16, the pedestrian 4C is notified to the driver in the period from the time tb to the time tc. In the period from the time tc to the time td, the preceding vehicle 3A is notified to the driver. In the period from the time td to the time te, the pedestrian 4C is notified to the driver.

However, considering seriousness in the unlikely event of an accident, the risk factor 4 such as the pedestrian 4C is more important to the driver than just the preceding vehicle 3A. If the driver is not notified of the pedestrian 4C despite that the driver perceives the pedestrian 4C, the driver may feel a sense of uneasiness. Moreover, in the case of the comparative example, the notification (icon) displayed on the display device 51 is frequently switched. The driver may feel a sense of annoyance against such the frequent switching of the notification.

In view of the above, the processor 110 always notifies the driver of the pedestrian 4C regardless of the selected deceleration DS in the period in which the deceleration assist control and the risk avoidance control operate concurrently. As a result, it is possible to reduce the driver's sense of uneasiness about the notification in the case where the deceleration assist control and the risk avoidance control operate concurrently. In addition, since the frequent switching of the notification is suppressed, the driver's sense of annoyance against the frequent switching of the notification is reduced.

Figure 17:
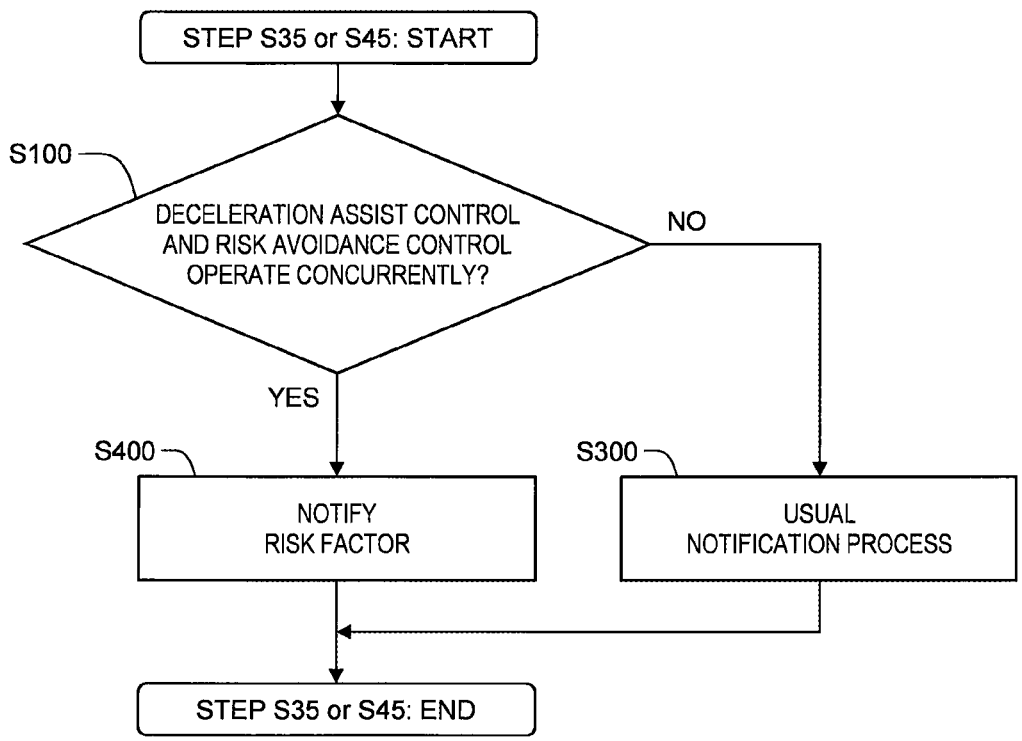
FIG. 17 is a flow chart summarizing the first example of the notification process according to an embodiment of the present disclosure.

FIG. 17 is a flow chart summarizing the first example of the notification process (Step S35, Step S45) according to the present embodiment.

In Step S100, the processor 110 determines whether or not the deceleration assist control and the risk avoidance control operate concurrently. When only one of the deceleration assist control and the risk avoidance control operates (Step S100; No), the processing proceeds to Step S300. On the other hand, when the deceleration assist control and the risk avoidance control operate concurrently (Step S100; Yes), the processing proceeds to Step S400.

In Step S300, the processor 110 executes the usual notification process. More specifically, when the deceleration assist control operates, the processor 110 notifies the driver of the deceleration target 3. On the other hand, when the risk avoidance control operates, the processor 110 notifies the driver of the risk factor 4.

In Step S400, the processor 110 notifies the driver of not the deceleration target 3 but the risk factor 4.

As described above, according to the first example, the driver is notified of not the deceleration target 3 but the risk factor 4 in the period in which both the deceleration assist control and the risk avoidance control operate concurrently. Since both the deceleration target 3 and the risk factor 4 are not notified at the same time, the driver's sense of annoyance caused by information overload is reduced. In addition, since the risk factor 4 being more important to the driver is notified, the driver's sense of uneasiness about the notification is reduced. Furthermore, since the frequent switching of the notification is suppressed, the driver's sense of annoyance against the frequent switching of the notification is reduced.

6-2. Second Example

Figure 18:
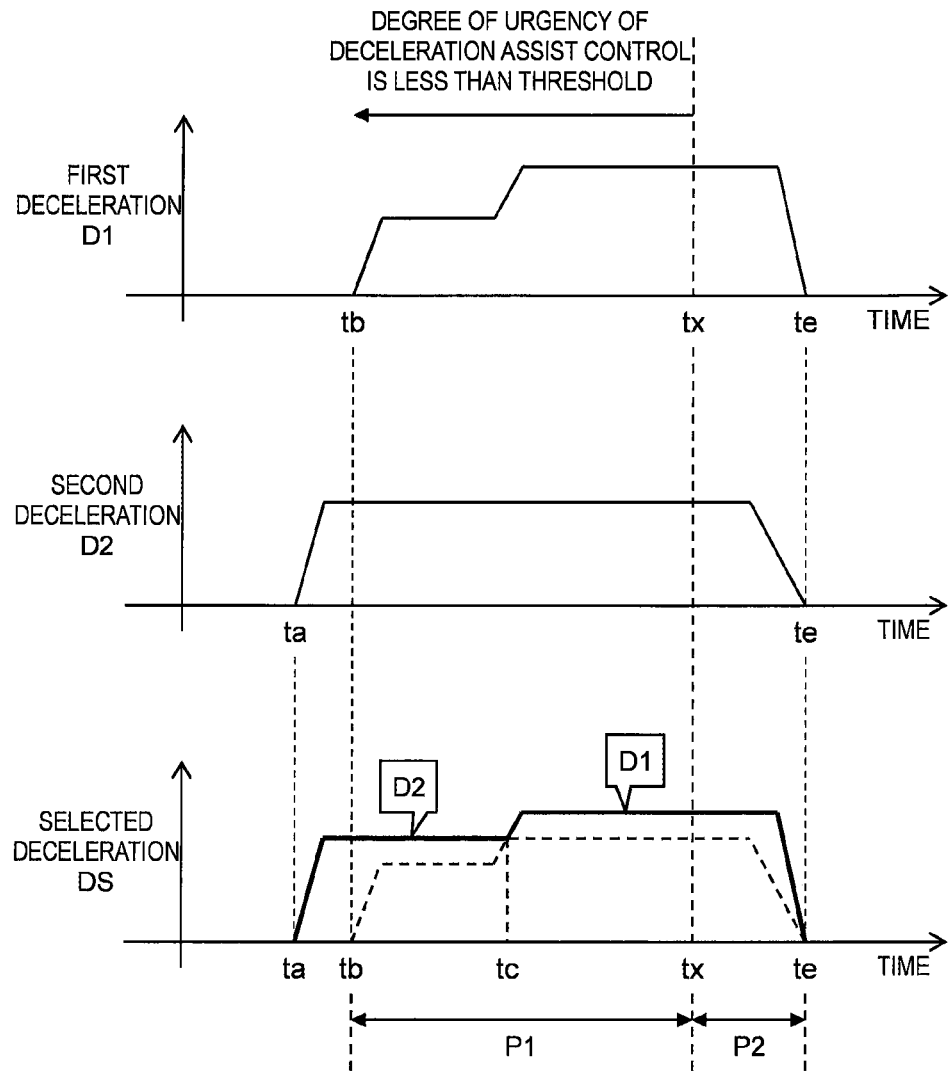
FIG. 18 is a timing chart showing another example of a deceleration profile required by the deceleration assist control and the risk avoidance control according to an embodiment of the present disclosure.

FIG. 18 is a timing chart showing another example of the deceleration profile required by the deceleration assist control and the risk avoidance control. In the example shown in FIG. 18, the selected deceleration DS in a period from a time tc to a time to is the first deceleration D1. Moreover, in that period, the risk of the preceding vehicle 3A increases and a "degree of urgency" of the deceleration assist control with respect to the preceding vehicle 3A increases.

In a period from a time tb to a time tx, the degree of urgency of the deceleration assist control is less than a threshold. Here, a situation in which "the degree of urgency of the deceleration assist control is less than the threshold" means any of (1) a situation in which a time (TTC) for the vehicle 1 to reach the deceleration target 3 is equal to or greater than a first threshold, (2) a situation in which a distance between the vehicle 1 and the deceleration target 3 is equal to or greater than a second threshold, and (3) a situation in which the first deceleration D1 required by the deceleration assist control is less than a maximum realizable deceleration that can be realized in the vehicle 1. A period in which both the deceleration assist control and the risk avoidance control operate concurrently and the degree of urgency of the deceleration assist control is less than the threshold is hereinafter referred to as a "first period P1."

In a period from the time tx to the time te, the degree of urgency of the deceleration assist control is equal to or greater than the threshold. A period in which both the deceleration assist control and the risk avoidance control operate concurrently and the degree of urgency of the deceleration assist control is equal to or greater than the threshold is hereinafter referred to as a "second period P2."

Figure 19:
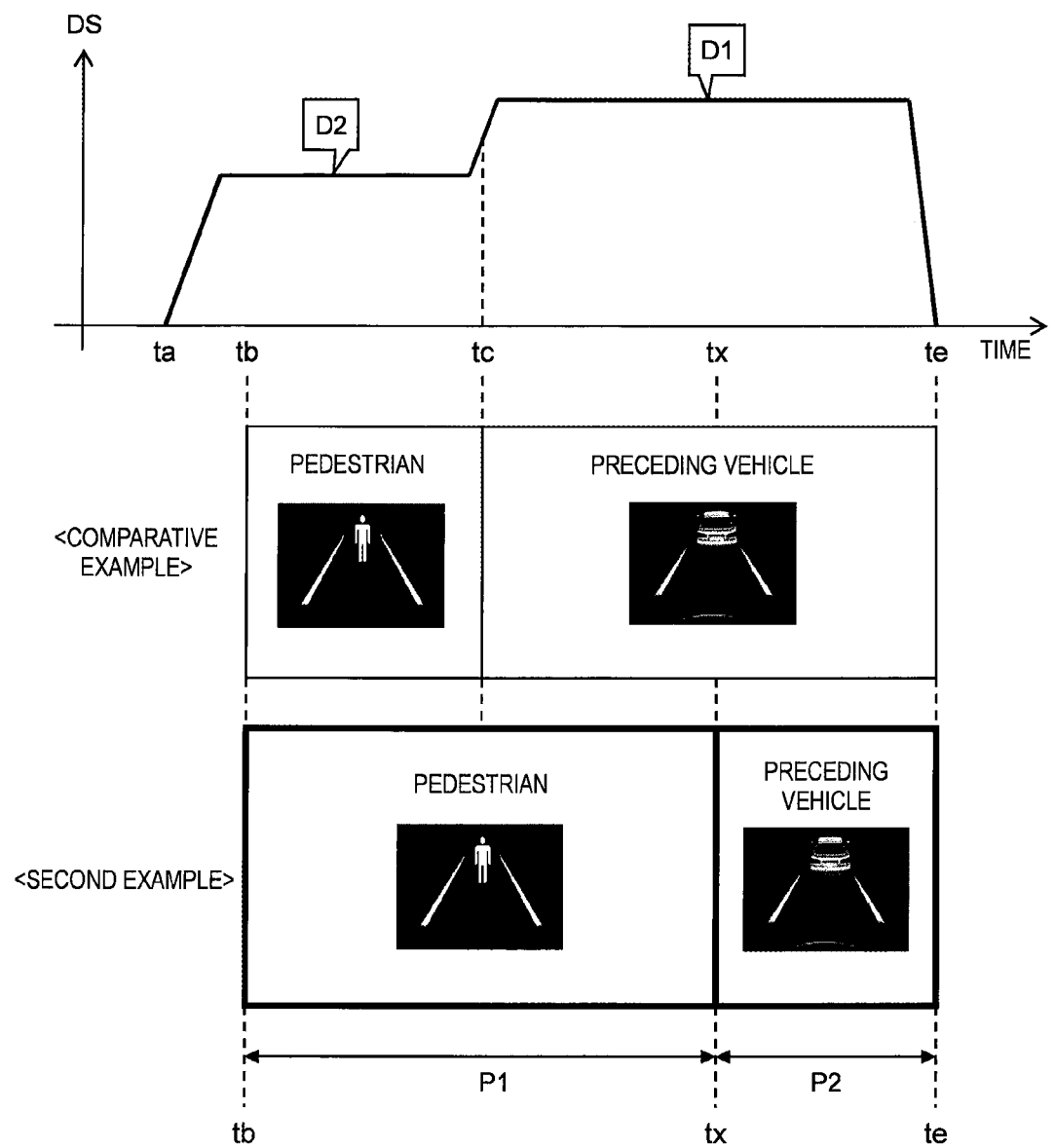
FIG. 19 is a conceptual diagram for explaining a second example of the notification process according to an embodiment of the present disclosure.

FIG. 19 is a conceptual diagram for explaining the second example of the notification process according to the present embodiment. FIG. 19 shows examples of the selected deceleration DS and the notification (icon) displayed on the display device 51 in the situation shown in FIG. 18.

In the case of the comparative example, the pedestrian 4C is notified to the driver in the period from the time tb to the time tc. In the period from the time tc to the time te, the preceding vehicle 3A is notified to the driver.

According to the second example, in the first period P1 from the time tb to the time tx, the processor 110 notifies the driver of not the preceding vehicle 3A but the pedestrian 4C (a first notification process). On the other hand, in the second period P2 from the time tx to the time te, the processor 110 notifies the driver of not the pedestrian 4C but the preceding vehicle 3A (a second notification process). That is, the processor 110 notifies the pedestrian 4C as much as possible, but preferentially notifies the preceding vehicle 3A when the urgency is high. Since the preceding vehicle 3A with low urgency is not notified and only the preceding vehicle 3A with high urgency is notified to the driver, the driver's senses of annoyance and uneasiness about the notification are reduced.

Figure 20:
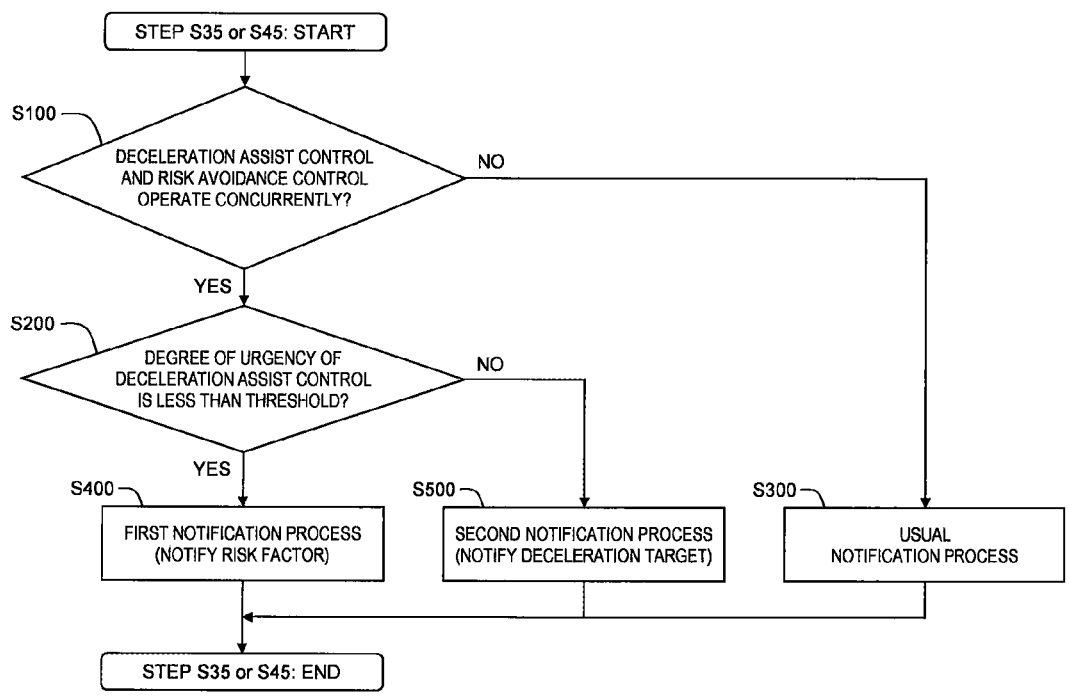
FIG. 20 is a flow chart summarizing the second example of the notification process according to an embodiment of the present disclosure.

FIG. 20 is a flow chart summarizing the second example of the notification process (Step S35, Step S45) according to the present embodiment. A description overlapping with the first example described above will be omitted as appropriate.

Steps S100 and S300 are the same as those in the case of the first example. When the deceleration assist control and the risk avoidance control operate concurrently (Step S100; Yes), the processing proceeds to Step S200.

In Step S200, the processor 110 determines whether or not the degree of urgency of the deceleration assist control is less than the threshold based on the driving environment information 200. When the degree of urgency of the deceleration assist control is less than the threshold (Step S200; Yes), the processing proceeds to Step S400. On the other hand, when the degree of urgency of the deceleration assist control is equal to or greater than the threshold (Step S200; No), the processing proceeds to Step S500.

In Step S400, the processor 110 executes a first notification process. In the first notification process, the processor 110 notifies the driver of not the deceleration target 3 but the risk factor 4. In other words, in the first period P1, the processor 110 notifies the driver of not the deceleration target 3 but the risk factor 4.

In Step S500, the processor 110 executes a second notification process. In the second notification process, the processor 110 notifies the driver of not the risk factor 4 but the deceleration target 3. In other words, in the second period P2, the processor 110 notifies the driver of not the risk factor 4 but the deceleration target 3.

As described above, according to the second example, the driver is notified of not the deceleration target 3 but the risk factor 4, in the first period P1 in which both the deceleration assist control and the risk avoidance control operate concurrently and the degree of urgency of the deceleration assist control is less than the threshold. Since both the deceleration target 3 and the risk factor 4 are not notified at the same time, the driver's sense of annoyance caused by information overload is reduced. In addition, since not the deceleration target 3 with low urgency but the risk factor 4 being more important to the driver is notified, the driver's sense of uneasiness about the notification is reduced.

Moreover, in the second period P2 in which both the deceleration assist control and the risk avoidance control operate concurrently and the degree of urgency of the deceleration assist control is equal to or greater than the threshold, the driver is notified of the deceleration target 3. Since the deceleration target 3 with low urgency is not notified and only the deceleration target 3 with high urgency is notified to the driver, the driver's senses of annoyance and uneasiness about the notification are reduced.

What is claimed is:

1. A driving assist system that assists driving of a vehicle, the driving assist system comprising:
a processor; and
a memory that stores driving environment information indicating a driving environment for the vehicle, wherein
a deceleration target includes at least one of a preceding vehicle, a mandatory stop line, a mandatory stop sign, a traffic signal, and a stop line before the traffic signal, each of which exists ahead of the vehicle,
a risk factor includes at least one of a pedestrian, a bicycle, a motorcycle, an oncoming vehicle, and a parked vehicle, each of which exists ahead of the vehicle,
the processor is configured to:
determine whether a first activation condition of deceleration assist control that automatically decelerates the vehicle before the deceleration target is satisfied based on the driving environment information;
when the first activation condition is satisfied, execute the deceleration assist control that automatically decelerates the vehicle before the deceleration target;
determine whether a second activation condition of risk avoidance control that automatically performs at least one of steering and deceleration of the vehicle so as to avoid the risk factor is satisfied based on the driving environment information;
when the second activation condition is satisfied, execute the risk avoidance control that generates a target trajectory of the vehicle so as to avoid the risk factor and automatically performs at least one of steering and deceleration of the vehicle such that the vehicle follows the target trajectory; and
execute a notification process that notifies a driver of the vehicle of the deceleration target or the risk factor, and
the notification process includes notifying the driver of not the deceleration target but the risk factor in a period in which both the first activation condition and the second activation condition are satisfied concurrently and both the deceleration assist control and the risk avoidance control operate concurrently, and wherein
when the deceleration assist control and the risk avoidance control concurrently operate, the deceleration assist control requires a first deceleration, and the risk avoidance control requires a second deceleration, the processor decelerates the vehicle at a higher one of the first deceleration and the second deceleration.

2. The driving assist system according to claim 1, wherein in the risk avoidance control, the processor is further configured to:
set a risk area around the risk factor;
generate the target trajectory of the vehicle such that the vehicle does not pass through the risk area; and
performs at least one of steering and deceleration of the vehicle such that the vehicle follows the target trajectory.

3. The driving assist system according to claim 2, wherein the processor variably sets a size of the risk area according to a speed of the vehicle such that the size of the risk area becomes larger as the speed of the vehicle becomes higher.

4. The driving assist system according to claim 1, wherein the first activation condition of the deceleration assist control includes that a time for the vehicle to reach the deceleration target is less than a predetermined time threshold, or a distance between the vehicle and the deceleration target is less than a predetermined distance threshold.

5. The driving assist system according to claim 4, wherein the first activation condition of the deceleration assist control further includes that a speed of the vehicle is equal to or higher than a predetermined speed.

6. The driving assist system according to claim 1, wherein the second activation condition of the risk avoidance control includes that a time for the vehicle to reach the risk factor is less than a predetermined time threshold, or a distance between the vehicle and the risk factor is less than a predetermined distance threshold.

7. The driving assist system according to claim 6, wherein the second activation condition of the risk avoidance control further includes that a speed of the vehicle is equal to or higher than a predetermined speed.

8. The driving assist system according to claim 1, wherein when the second activation condition is satisfied, the processor is configured to execute the risk avoidance control that generates the target trajectory of the vehicle so as to avoid the risk factor and automatically performs steering and deceleration of the vehicle such that the vehicle follows the target trajectory.

9. A driving assist system that assists driving of a vehicle, the driving assist system comprising:
a processor; and
a memory that stores driving environment information indicating a driving environment for the vehicle, wherein
a deceleration target includes at least one of a preceding vehicle, a mandatory stop line, a mandatory stop sign, a traffic signal, and a stop line before the traffic signal, each of which exists ahead of the vehicle,
a risk factor includes at least one of a pedestrian, a bicycle, a motorcycle, an oncoming vehicle, and a parked vehicle, each of which exists ahead of the vehicle,
the processor is configured to:
determine whether a first activation condition of deceleration assist control that automatically decelerates the vehicle before the deceleration target is satisfied based on the driving environment information;
when the first activation condition is satisfied, execute the deceleration assist control that automatically decelerates the vehicle before the deceleration target;
determine whether a second activation condition of risk avoidance control that automatically performs at least one of steering and deceleration of the vehicle so as to avoid the risk factor is satisfied based on the driving environment information;
when the second activation condition is satisfied, execute the risk avoidance control that generates a target trajectory of the vehicle so as to avoid the risk factor and automatically performs at least one of steering and deceleration of the vehicle such that the vehicle follows the target trajectory; and
execute a notification process that notifies a driver of the vehicle of the deceleration target or the risk factor, and
the notification process includes a first notification process that notifies the driver of not the deceleration target but the risk factor in a first period, and the first period includes a period in which both the first activation condition and the second activation condition are satisfied concurrently, both the deceleration assist control and the risk avoidance control operate concurrently, and a degree of urgency of the deceleration assist control is less than a threshold, and wherein when the deceleration assist control and the risk avoidance control concurrently operate, the deceleration assist control requires a first deceleration, and the risk avoidance control requires a second deceleration, the processor decelerates the vehicle at a higher one of the first deceleration and the second deceleration.

10. The driving assist system according to claim 9, wherein the notification process further includes a second notification process that notifies the driver of not the risk factor but the deceleration target in a second period, and the second period includes a period in which both the first activation condition and the second activation condition are satisfied concurrently, both the deceleration assist control and the risk avoidance control operate concurrently and the degree of urgency of the deceleration assist control is equal to or greater than the threshold.

11. The driving assist system according to claim 9, wherein a situation in which the degree of urgency of the deceleration assist control is less than the threshold includes any of:

a situation in which a time for the vehicle to reach the deceleration target is equal to or greater than a first threshold;

a situation in which a distance between the vehicle and the deceleration target is equal to or greater than a second threshold; and a situation in which the first deceleration required by the deceleration assist control is less than a maximum realizable deceleration.

12. The driving assist system according to claim 9, wherein when the second activation condition is satisfied, the processor is configured to execute the risk avoidance control that generates the target trajectory of the vehicle so as to avoid the risk factor and automatically performs steering and deceleration of the vehicle such that the vehicle follows the target trajectory.

* * * * *